US007332537B2

(12) United States Patent
Bredt et al.

(10) Patent No.: US 7,332,537 B2
(45) Date of Patent: *Feb. 19, 2008

(54) THREE DIMENSIONAL PRINTING MATERIAL SYSTEM AND METHOD

(75) Inventors: James F. Bredt, Watertown, MA (US); Timothy C. Anderson, Palm Coast, FL (US); David B. Russell, Burlington, MA (US)

(73) Assignee: Z Corporation, Burlington, MA (US)

( * ) Notice: Subject to any disclaimer, the term of this patent is extended or adjusted under 35 U.S.C. 154(b) by 413 days.

This patent is subject to a terminal disclaimer.

(21) Appl. No.: 10/650,086

(22) Filed: Aug. 26, 2003

(65) Prior Publication Data

US 2004/0138336 A1    Jul. 15, 2004

Related U.S. Application Data

(63) Continuation-in-part of application No. 09/832,309, filed on Apr. 10, 2001, now Pat. No. 6,610,429, which is a continuation of application No. 09/182,295, filed on Oct. 29, 1998, now abandoned, which is a continuation-in-part of application No. 08/707,693, filed on Sep. 4, 1996, now Pat. No. 5,902,441.

(51) Int. Cl.
*C08K 3/30* (2006.01)
*C08K 5/09* (2006.01)
*C08L 3/02* (2006.01)
*C08L 5/00* (2006.01)
*C08L 31/04* (2006.01)
*C08L 1/02* (2006.01)
*C08J 3/02* (2006.01)

(52) U.S. Cl. .................. 524/423; 524/27; 524/35; 524/47; 524/48; 524/284; 524/563

(58) Field of Classification Search ............... 523/160; 264/401
See application file for complete search history.

(56) References Cited

U.S. PATENT DOCUMENTS

| | | | |
|---|---|---|---|
| 2,662,024 A * | 12/1953 | Riddell et al. ............... 106/701 |
| 3,297,601 A * | 1/1967 | Maynard et al. ............... 524/5 |
| 3,303,147 A * | 2/1967 | Elden ............................. 524/5 |
| 3,309,328 A * | 3/1967 | Carroll et al. ............... 524/145 |
| 3,476,190 A | 11/1969 | Jenny et al. |
| 3,525,632 A | 8/1970 | Enoch |
| 3,835,074 A * | 9/1974 | Desmarais ............... 106/197.01 |
| 3,852,083 A * | 12/1974 | Yang ............................ 106/701 |
| 3,870,538 A | 3/1975 | Burkard et al. |
| 3,926,870 A | 12/1975 | Keegan et al. |
| 3,932,923 A | 1/1976 | DiMatteo |
| 4,041,476 A | 8/1977 | Swainson |
| 4,042,408 A * | 8/1977 | Murray et al. ............... 106/744 |
| 4,078,229 A | 3/1978 | Swanson et al. |
| 4,247,508 A | 1/1981 | Housholder |
| 4,288,861 A | 9/1981 | Swainson et al. |
| 4,310,996 A * | 1/1982 | Mulvey et al. ............ 52/794.1 |
| 4,327,156 A | 4/1982 | Dillon et al. |
| 4,369,025 A | 1/1983 | von der Weid |
| 4,443,392 A | 4/1984 | Becker et al. |
| 4,575,330 A | 3/1986 | Hull |
| 4,613,627 A | 9/1986 | Sherman et al. |
| 4,618,390 A | 10/1986 | Powell |
| 4,665,492 A | 5/1987 | Masters |
| 4,752,352 A | 6/1988 | Feygin |
| 4,752,498 A | 6/1988 | Fudim |
| 4,755,227 A | 7/1988 | Sherif et al. |
| 4,758,278 A | 7/1988 | Tomic |
| 4,801,477 A | 1/1989 | Fudim |
| 4,844,144 A | 7/1989 | Murphy et al. |
| 4,863,538 A | 9/1989 | Deckard |
| 4,929,402 A | 5/1990 | Hull |
| 4,938,816 A | 7/1990 | Beaman et al. |
| 4,940,412 A | 7/1990 | Blumenthal |
| 4,942,001 A | 7/1990 | Murphy et al. |
| 4,942,003 A | 7/1990 | Bold |
| 4,942,060 A | 7/1990 | Grossa |
| 4,943,928 A | 7/1990 | Cambell et al. |
| 4,944,817 A | 7/1990 | Bourell et al. |
| 4,945,032 A | 7/1990 | Murphy et al. |
| 4,961,154 A | 10/1990 | Pomerantz et al. |

(Continued)

FOREIGN PATENT DOCUMENTS

DE    40 12 044    10/1991

(Continued)

OTHER PUBLICATIONS

Borland, "Characterization of Fundamental and Reticulated Biomedical Polymer Structures Fabricated by Three Dimensional Printing," Thesis, MIT, Jun. 1995, pp. 1-142.

(Continued)

*Primary Examiner*—Callie Shosho
(74) *Attorney, Agent, or Firm*—Goodwin Procter LLP (57) ABSTRACT

The present invention is directed to a 3DP™ material composition and method of use. The composition of the present invention includes an adhesive material, a fibrous component and a filler. Alternatively, the composition may include a particulate material having a mean particle size between about 10 microns and about 300 microns, a soluble adhesive material. The compositions may also include an accelerator and an additional adhesive.

64 Claims, 3 Drawing Sheets

U.S. PATENT DOCUMENTS

| | | |
|---|---|---|
| 4,996,010 A | 2/1991 | Modrek |
| 4,996,282 A | 2/1991 | Noren et al. |
| 4,999,143 A | 3/1991 | Hull et al. |
| 5,009,585 A | 4/1991 | Hirano et al. |
| 5,011,635 A | 4/1991 | Murphy et al. |
| 5,015,312 A | 5/1991 | Kinzie |
| 5,015,424 A | 5/1991 | Smalley |
| 5,017,317 A | 5/1991 | Marcus |
| 5,017,753 A | 5/1991 | Deckard |
| 5,031,120 A | 7/1991 | Pomerantz et al. |
| 5,038,014 A | 8/1991 | Pratt et al. |
| 5,040,005 A | 8/1991 | Davidson et al. |
| 5,051,334 A | 9/1991 | Fan |
| 5,053,090 A | 10/1991 | Beaman et al. |
| 5,058,988 A | 10/1991 | Spence |
| 5,059,021 A | 10/1991 | Spence et al. |
| 5,059,266 A | 10/1991 | Yamane et al. |
| 5,059,359 A | 10/1991 | Hull et al. |
| 5,071,337 A | 12/1991 | Heller et al. |
| 5,071,503 A | 12/1991 | Berman |
| 5,076,869 A | 12/1991 | Bourell et al. |
| 5,076,974 A | 12/1991 | Modrek et al. |
| 5,088,047 A | 2/1992 | Bynum |
| 5,089,184 A | 2/1992 | Hirano et al. |
| 5,089,185 A | 2/1992 | Hirano et al. |
| 5,094,935 A | 3/1992 | Vassiliou et al. |
| 5,096,530 A | 3/1992 | Cohen |
| 5,104,592 A | 4/1992 | Hull et al. |
| 5,106,288 A | 4/1992 | Hughes |
| 5,121,329 A | 6/1992 | Crump |
| 5,122,441 A | 6/1992 | Lawton et al. |
| 5,123,734 A | 6/1992 | Spence et al. |
| 5,127,037 A | 6/1992 | Bynum |
| 5,128,235 A | 7/1992 | Vassiliou et al. |
| 5,130,064 A | 7/1992 | Smalley et al. |
| 5,132,143 A | 7/1992 | Deckard |
| 5,133,987 A | 7/1992 | Spence et al. |
| 5,134,569 A | 7/1992 | Masters |
| 5,135,379 A | 8/1992 | Fudim |
| 5,135,695 A | 8/1992 | Marcus |
| 5,137,662 A | 8/1992 | Hull et al. |
| 5,139,338 A | 8/1992 | Pomerantz et al. |
| 5,139,711 A | 8/1992 | Nakamura et al. |
| 5,141,680 A | 8/1992 | Almquist et al. |
| 5,143,663 A | 9/1992 | Leyden et al. |
| 5,143,817 A | 9/1992 | Lawton et al. |
| 5,147,587 A | 9/1992 | Marcus et al. |
| 5,149,548 A | 9/1992 | Yamane et al. |
| 5,151,813 A | 9/1992 | Yamamoto et al. |
| 5,154,762 A | 10/1992 | Mitra et al. |
| 5,155,321 A | 10/1992 | Grube et al. |
| 5,155,324 A | 10/1992 | Deckard et al. |
| 5,157,423 A | 10/1992 | Zur |
| 5,158,858 A | 10/1992 | Lawton et al. |
| 5,164,128 A | 11/1992 | Modrek et al. |
| 5,167,882 A | 12/1992 | Jacobine et al. |
| 5,169,579 A | 12/1992 | Marcus et al. |
| 5,171,490 A | 12/1992 | Fudim |
| 5,173,220 A | 12/1992 | Reiff et al. |
| 5,174,931 A | 12/1992 | Almquist et al. |
| 5,174,943 A | 12/1992 | Hull |
| 5,175,077 A | 12/1992 | Grossa |
| 5,176,188 A | 1/1993 | Quinn et al. |
| 5,182,055 A | 1/1993 | Allison et al. |
| 5,182,056 A | 1/1993 | Spence et al. |
| 5,182,715 A | 1/1993 | Vorgitch et al. |
| 5,183,598 A | 2/1993 | Hellé et al. |
| 5,184,307 A | 2/1993 | Hull et al. |
| 5,192,469 A | 3/1993 | Smalley et al. |
| 5,192,559 A | 3/1993 | Hull et al. |
| 5,198,159 A | 3/1993 | Nakamura et al. |
| 5,203,944 A | 4/1993 | Prinz et al. |
| 5,204,055 A | 4/1993 | Sachs et al. |
| 5,204,124 A | 4/1993 | Secretan et al. |
| 5,204,823 A | 4/1993 | Schlotterbeck |
| 5,207,371 A | 5/1993 | Prinz et al. |
| 5,209,878 A | 5/1993 | Smalley et al. |
| 5,216,616 A | 6/1993 | Masters |
| 5,217,653 A | 6/1993 | Mashinsky |
| 5,234,636 A | 8/1993 | Hull et al. |
| 5,236,637 A | 8/1993 | Hull |
| 5,236,812 A | 8/1993 | Vassiliou et al. |
| 5,238,614 A | 8/1993 | Uchinono et al. |
| 5,238,639 A | 8/1993 | Vinson et al. |
| 5,247,180 A | 9/1993 | Mitcham et al. |
| 5,248,249 A | 9/1993 | Yamamto et al. |
| 5,248,456 A | 9/1993 | Evans et al. |
| 5,252,264 A | 10/1993 | Forderhase et al. |
| 5,256,340 A | 10/1993 | Allison et al. |
| 5,258,146 A | 11/1993 | Almquist et al. |
| 5,260,009 A | 11/1993 | Penn |
| 5,263,130 A | 11/1993 | Pomerantz et al. |
| 5,264,061 A | 11/1993 | Juskey et al. |
| 5,267,013 A | 11/1993 | Spence |
| 5,273,691 A | 12/1993 | Hull et al. |
| 5,278,442 A | 1/1994 | Prinz et al. |
| 5,281,789 A | 1/1994 | Merz et al. |
| 5,286,573 A | 2/1994 | Prinz et al. |
| 5,287,435 A | 2/1994 | Cohen et al. |
| 5,289,214 A | 2/1994 | Zur |
| 5,296,062 A | 3/1994 | Bourell et al. |
| 5,296,335 A | 3/1994 | Thomas et al. |
| 5,301,415 A | 4/1994 | Prinz et al. |
| 5,301,863 A | 4/1994 | Prinz et al. |
| 5,303,141 A | 4/1994 | Batchelder et al. |
| 5,306,446 A | 4/1994 | Howe |
| 5,306,447 A | 4/1994 | Marcus et al. |
| 5,316,580 A | 5/1994 | Deckard |
| 5,340,433 A | 8/1994 | Crump |
| 5,340,656 A | 8/1994 | Sachs et al. |
| 5,342,566 A | 8/1994 | Schafer et al. |
| 5,342,919 A | 8/1994 | Dickens et al. |
| 5,344,298 A | 9/1994 | Hull |
| 5,345,391 A | 9/1994 | Hull et al. |
| 5,348,693 A | 9/1994 | Taylor et al. |
| 5,352,310 A | 10/1994 | Natter |
| 5,352,405 A | 10/1994 | Beaman et al. |
| 5,354,414 A | 10/1994 | Feygin |
| 5,355,318 A | 10/1994 | Dionnet et al. |
| 5,358,673 A | 10/1994 | Heller et al. |
| 5,364,889 A | 11/1994 | Quinn et al. |
| 5,365,996 A | 11/1994 | Crook |
| 5,370,692 A | 12/1994 | Fink et al. |
| 5,376,320 A | 12/1994 | Tiefenbacher et al. |
| 5,382,308 A | 1/1995 | Bourell et al. |
| 5,385,772 A * | 1/1995 | Slovinsky et al. .......... 428/220 |
| 5,386,500 A | 1/1995 | Pomerantz et al. |
| 5,387,380 A | 2/1995 | Cima et al. |
| 5,391,072 A | 2/1995 | Lawton et al. |
| 5,391,460 A | 2/1995 | Dougherty et al. |
| 5,393,613 A | 2/1995 | MacKay |
| 5,402,351 A | 3/1995 | Batchelder et al. |
| 5,415,820 A | 5/1995 | Furuta et al. |
| 5,418,112 A | 5/1995 | Mirle et al. |
| 5,426,722 A | 6/1995 | Batchelder |
| 5,429,788 A | 7/1995 | Ribble et al. |
| 5,429,908 A | 7/1995 | Hokuf et al. |
| 5,430,666 A | 7/1995 | DeAngelis et al. |
| 5,432,045 A | 7/1995 | Narukawa et al. |
| 5,433,280 A | 7/1995 | Smith |
| 5,435,902 A | 7/1995 | André |
| 5,437,964 A | 8/1995 | Lapin et al. |
| 5,439,622 A | 8/1995 | Pennisi et al. |
| 5,447,822 A | 9/1995 | Hull et al. |

| | | | | | | |
|---|---|---|---|---|---|---|
| 5,450,205 A | 9/1995 | Sawin et al. | | 5,633,021 A | 5/1997 | Brown et al. |
| 5,458,825 A | 10/1995 | Grolman et al. | | 5,637,169 A | 6/1997 | Hull et al. |
| 5,460,758 A | 10/1995 | Langer et al. | | 5,637,175 A | 6/1997 | Feygin et al. |
| 5,461,088 A | 10/1995 | Wolf et al. | | 5,639,070 A | 6/1997 | Deckard |
| 5,468,886 A | 11/1995 | Steinmann et al. | | 5,639,402 A | 6/1997 | Barlow et al. |
| 5,470,689 A | 11/1995 | Wolf et al. | | 5,639,413 A | 6/1997 | Crivello |
| 5,474,719 A | 12/1995 | Fan et al. | | 5,640,667 A | 6/1997 | Freitag et al. |
| 5,482,659 A | 1/1996 | Sauerhoefer | | 5,641,448 A | 6/1997 | Yeung et al. |
| 5,490,882 A | 2/1996 | Sachs et al. | | 5,645,973 A | 7/1997 | Hofmann et al. |
| 5,490,962 A | 2/1996 | Cima et al. | | 5,648,450 A | 7/1997 | Dickens et al. |
| 5,491,643 A | 2/1996 | Batchelder | | 5,649,277 A * | 7/1997 | Greul et al. ............. 419/2 |
| 5,494,618 A | 2/1996 | Sitzmann et al. | | 5,650,260 A | 7/1997 | Onishi |
| 5,495,029 A | 2/1996 | Steinmann et al. | | 5,651,934 A | 7/1997 | Almquist et al. |
| 5,495,328 A | 2/1996 | Spence et al. | | 5,653,925 A | 8/1997 | Batchelder |
| 5,498,782 A | 3/1996 | Rex | | 5,656,230 A | 8/1997 | Khoshevis |
| 5,500,069 A | 3/1996 | Ogue et al. | | 5,658,412 A | 8/1997 | Retallick et al. |
| 5,501,824 A | 3/1996 | Almquist et al. | | 5,658,712 A | 8/1997 | Steinmann et al. |
| 5,503,785 A | 4/1996 | Crump et al. | | 5,659,478 A | 8/1997 | Pennisi et al. |
| 5,503,793 A | 4/1996 | Uchinono et al. | | 5,660,621 A | 8/1997 | Bredt |
| 5,506,046 A | 4/1996 | Andersen et al. | | 5,660,900 A | 8/1997 | Andersen et al. |
| 5,506,087 A | 4/1996 | Lapin et al. | | 5,663,883 A | 9/1997 | Thomas et al. |
| 5,506,607 A | 4/1996 | Sanders et al. | | 5,665,401 A | 9/1997 | Serbin et al. |
| 5,507,336 A | 4/1996 | Tobin | | 5,667,820 A | 9/1997 | Heller et al. |
| 5,510,226 A | 4/1996 | Lapin et al. | | 5,672,312 A | 9/1997 | Almquist et al. |
| 5,512,162 A | 4/1996 | Sachs et al. | | 5,674,921 A | 10/1997 | Regula et al. |
| 5,514,232 A | 5/1996 | Burns | | 5,676,904 A | 10/1997 | Almquist et al. |
| 5,514,378 A | 5/1996 | Mikos et al. | | 5,684,713 A | 11/1997 | Asada et al. |
| 5,518,680 A | 5/1996 | Cima et al. | | 5,688,464 A | 11/1997 | Jacobs et al. |
| 5,519,816 A | 5/1996 | Pomerantz et al. | | 5,693,144 A | 12/1997 | Jacobs et al. |
| 5,525,051 A | 6/1996 | Takano | | 5,695,707 A | 12/1997 | Almquist et al. |
| 5,527,877 A | 6/1996 | Dickens et al. | | 5,697,043 A | 12/1997 | Baskaran et al. |
| 5,534,059 A | 7/1996 | Immordino | | 5,698,485 A | 12/1997 | Brück et al. |
| 5,534,104 A | 7/1996 | Langer et al. | | 5,700,406 A | 12/1997 | Manhennett et al. |
| 5,536,467 A | 7/1996 | Reichle et al. | | 5,705,116 A | 1/1998 | Sitzmann et al. |
| 5,545,367 A | 8/1996 | Bae | | 5,705,117 A | 1/1998 | O'Connor et al. |
| 5,554,336 A | 9/1996 | Hull | | 5,705,316 A | 1/1998 | Steinmann et al. |
| 5,555,176 A | 9/1996 | Menhennett et al. | | 5,707,578 A | 1/1998 | Johnson et al. |
| 5,555,481 A | 9/1996 | Rock et al. | | 5,707,780 A | 1/1998 | Lawton et al. |
| 5,556,590 A | 9/1996 | Hull | | 5,711,911 A | 1/1998 | Hull |
| 5,569,349 A | 10/1996 | Almquist et al. | | 5,713,410 A | 2/1998 | LaSalle et al. |
| 5,569,431 A | 10/1996 | Hull | | 5,717,599 A | 2/1998 | Manhennett et al. |
| 5,571,471 A | 11/1996 | Hull | | 5,718,279 A | 2/1998 | Satoh et al. |
| 5,572,431 A | 11/1996 | Brown et al. | | 5,727,138 A | 3/1998 | Harada |
| 5,573,721 A | 11/1996 | Gillette | | 5,728,345 A | 3/1998 | Hlavaty et al. |
| 5,573,722 A | 11/1996 | Hull | | 5,730,817 A | 3/1998 | Feygin et al. |
| 5,573,889 A | 11/1996 | Hofmann et al. | | 5,730,925 A | 3/1998 | Mattes et al. |
| 5,582,876 A | 12/1996 | Langer et al. | | 5,731,388 A | 3/1998 | Suzuki et al. |
| 5,587,913 A | 12/1996 | Abrams et al. | | 5,733,497 A | 3/1998 | McAlea et al. |
| 5,591,563 A | 1/1997 | Suzuki et al. | | 5,738,817 A | 4/1998 | Danforth et al. |
| 5,593,531 A | 1/1997 | Penn | | 5,738,921 A * | 4/1998 | Andersen et al. ......... 428/36.4 |
| 5,594,652 A | 1/1997 | Penn et al. | | 5,740,051 A | 4/1998 | Sanders et al. |
| 5,595,597 A | 1/1997 | Fogel et al. | | 5,746,844 A | 5/1998 | Sterett et al. |
| 5,595,703 A | 1/1997 | Swaelens et al. | | 5,746,967 A | 5/1998 | Hoy et al. |
| 5,596,504 A | 1/1997 | Tata et al. | | 5,749,041 A | 5/1998 | Lakshminarayan et al. |
| 5,597,520 A | 1/1997 | Smalley et al. | | 5,753,171 A | 5/1998 | Serbin et al. |
| 5,597,589 A | 1/1997 | Deckard | | 5,753,274 A | 5/1998 | Wilkening et al. |
| 5,598,340 A | 1/1997 | Medard et al. | | 5,783,358 A | 7/1998 | Schulthess et al. |
| 5,599,651 A | 2/1997 | Steinmann et al. | | 5,805,971 A | 9/1998 | Akedo |
| 5,603,797 A | 2/1997 | Thomas et al. | | 5,851,465 A | 12/1998 | Bredt |
| 5,605,941 A | 2/1997 | Steinmann et al. | | 5,902,441 A | 5/1999 | Bredt et al. |
| 5,608,814 A | 3/1997 | Gilmore et al. | | 5,943,235 A | 8/1999 | Earl et al. |
| 5,609,812 A | 3/1997 | Childers et al. | | 5,965,776 A * | 10/1999 | Leppard et al. ............. 568/15 |
| 5,609,813 A | 3/1997 | Allison et al. | | 6,007,318 A | 12/1999 | Russell et al. |
| 5,610,824 A | 3/1997 | Vinson et al. | | 6,112,109 A | 8/2000 | D'Urso |
| 5,611,883 A | 3/1997 | Tompkins et al. | | 6,193,922 B1 | 2/2001 | Ederer |
| 5,614,075 A | 3/1997 | André et al. | | 6,403,002 B1 | 6/2002 | van der Geest |
| 5,616,293 A | 4/1997 | Ashtiani-Zarandi et al. | | 6,416,850 B1 | 7/2002 | Bredt et al. |
| 5,616,294 A | 4/1997 | Deckard | | 6,423,255 B1 | 7/2002 | Hoechsmann et al. |
| 5,622,577 A | 4/1997 | O'Connor | | 6,610,429 B2 | 8/2003 | Bredt et al. |
| 5,622,811 A | 4/1997 | Ogue et al. | | 2002/0106412 A1 | 8/2002 | Rowe et al. |
| 5,626,919 A | 5/1997 | Chapman et al. | | | | |
| 5,630,981 A | 5/1997 | Hull | | | | |
| 5,632,848 A | 5/1997 | Richards et al. | | | | |

2004/0038009 A1  2/2004  Leyden et al.

FOREIGN PATENT DOCUMENTS

| | | |
|---|---|---|
| DE | 19853834 | 5/2000 |
| EP | 0 431 924 | 6/1991 |
| GB | 2048235 A * | 12/1980 |
| GB | 2155944 A * | 10/1985 |
| JP | 06-289612 | 10/1994 |
| JP | 11-116875 | 4/1999 |
| JP | 2001-162351 | 6/2001 |
| WO | WO 93/25336 | 12/1993 |
| WO | WO 94/12328 | 6/1994 |
| WO | WO 95/30503 | 11/1995 |
| WO | WO 97/11835 | 4/1997 |
| WO | WO 97/26302 | 7/1997 |
| WO | WO 98/09798 | 3/1998 |
| WO | WO 98/28124 | 7/1998 |

OTHER PUBLICATIONS

European Search Report for 03 029 489.6, Feb. 16, 2004, 3 pgs.

International Search Report for PCT/US97/15041, Jan. 12, 1998, 5 pgs.

International Search Report for PCT/US99/20628, Jan. 21, 2000, 5 pgs.

Ederer, "A 3D Print Process for Inexpensive Plastic Parts," Presentation for the Austin Solid Freeform Conference, 1995.

German, *Powder Injection Molding*, (1990), pp. 32-43 and 92-95.

Khanuja, "Origin and Control of Anisotropy in Three Dimensional Printing of Structural Ceramics," Thesis, MIT, Feb. 1996.

International Preliminary Examination Report for PCT/US97/15041, Oct. 19, 1998, 20 pgs.

Written Opinion for PCT/US99/20628, Jul. 27, 2000, 10 pgs.

Examination report in Canadian Patent Application No., 2,338,617, mailed Aug. 17, 2007 (2 pages).

US 4,937,420, 06/1990, Deckard (withdrawn)

* cited by examiner

THREE DIMENSIONAL PRINTING MATERIAL SYSTEM AND METHOD

This application is a continuation-in-part of U.S. patent application Ser. No. 09/832,309 filed Apr. 10, 2001, now U.S. Pat. No 6,610,429, which is a continuation of U.S. patent application Ser. No. 09/182,295, filed Oct. 29, 1998 and now abandoned, which is a continuation-in-part of U.S. patent Ser. No. 08/707,693, filed Sep. 4, 1996, now U.S. Pat. No. 5,902,441, all of which are incorporated be reference in their entirety for all purposes.

FIELD OF THE INVENTION

This invention relates generally to rapid prototyping techniques, and more particularly to Three Dimensional Printing materials and methods.

BACKGROUND

The field of rapid prototyping involves the production of prototype articles and functional parts, as well as ceramic shell molds for metal casting, directly from computer-generated design data.

Two well-known methods for rapid prototyping include a selective laser sintering process and a liquid binder Three Dimensional Printing process (3DP™, trademark of Massachusetts Institute of Technology, Cambridge, Mass.). The techniques are similar to the extent that they both use layering techniques to build three-dimensional articles. Both methods form successive thin cross sections of the desired article. The individual cross sections are formed by bonding together grains of a granular material on a flat surface of a bed of the granular material. Each layer is bonded to a previously formed layer to form the desired three-dimensional article at the same time as the grains of each layer are bonded together. The laser-sintering and liquid binder techniques are advantageous because they create parts directly from computer-generated design data and can produce parts having complex geometries. Moreover, 3DP™ methods can be quicker and less expensive than conventional machining of prototype parts or production of cast or molded parts by conventional "hard" or "soft" tooling techniques which can take from a few weeks to several months, depending on the complexity of the item.

3DP™ methods have been used to make ceramic molds for investment casting, thereby generating fully-functional metal parts. Additional uses have been contemplated for 3DP™ methods.

For example, 3DP™ methods may be useful in design-related fields where the articles may be used for visualization, demonstration and mechanical prototyping. It may also be useful for making patterns for molding processes. 3DP™ methods may be further useful, for example, in the fields of medicine and dentistry, where expected outcomes may be modeled prior to performing procedures. Other businesses that could benefit from rapid prototyping technology include architectural firms, as well as others in which visualization of a design is useful.

A selective laser sintering process is described in U.S. Pat. No. 4,863,538, which is incorporated herein by reference. The selective laser sintering process was commercialized by DTM Corporation. The selective laser sintering process involves spreading a thin layer of powder onto a flat surface. The powder is spread using a tool developed for use with the selective laser sintering process, known in the art as a counter-rolling mechanism (hereinafter "counter-roller").

Using the counter-roller allows thin layers of material to be spread evenly, without disturbing previous layers. After the layer of powder is spread onto the surface, a laser is used to direct laser energy onto the powder in a predetermined two-dimensional pattern. The laser sinters or fuses the powder together in the areas struck by its energy. The powder can be plastic, metal, polymer, ceramic or a composite. Successive layers of powder are spread over previous layers using the counter-roller, followed by sintering or fusing with the laser. The process is essentially thermal, requiring delivery by the laser of a sufficient amount of energy to sinter the powder together, and to previous layers, to form the final article.

The selective laser sintering process is expensive due to the high cost of the laser and the complexity of the equipment used. In addition, only one laser is used at a time, making it a slow method. In addition, depending on the application, materials are sometimes used in the selective laser sintering method that require special handling or processing facilities.

U.S. Pat. No. 5,204,055, incorporated herein by reference, describes an early 3DP™ method which involves the use of an inkjet printing head to deliver a liquid or colloidal binder material to layers of powdered material. The technique (hereafter "liquid binder method") involves applying a layer of a powdered material to a surface using a counter-roller. After the powdered material is applied to the surface, the ink-jet printhead delivers a liquid binder to the layer of powder. The binder infiltrates into gaps in the powder material, hardening to bond the powder material into a solidified layer. The hardened binder also bonds each layer to the previous layer. After the first cross-sectional portion is formed, the previous steps are repeated, building successive cross-sectional portions until the final article is formed. Optionally, the binder can be suspended in a carrier which evaporates, leaving the hardened binder behind. The powdered material can be ceramic, metal, plastic or a composite material, and can also include fiber. The liquid binder material can be organic or inorganic. Typical organic binder materials are polymeric resins, or ceramic precursors such as polycarbosilazone. Inorganic binders are used where the binder is incorporated into the final articles; silica is typically used in such an application.

One advantage of using an ink-jet print head rather than a laser is that inexpensive printheads are commercially available that have a plurality of spray nozzles used to deliver binder to the powder that are arranged side-by-side in a single print head. In selective laser sintering machines, only one laser, which delivers energy to the powder, is conventionally used. The combination of several spray nozzles increases the speed of liquid binder printing compared to laser-sintering by allowing a wider area to be printed at one time. In addition, the liquid binder printing equipment is much less expensive than the laser equipment due to the high cost of the laser and the high cost of the related beam deflection optics and controls.

However, the liquid binder printing technique has a serious reliability problem associated with the spray nozzles becoming clogged with the binder and/or powder material. Clogging occurs when binders having high levels of suspended solids are used. The problem with clogging requires frequent interruptions of the build in order to clean the spray nozzle. The clogging problem increases the time and labor required to build parts and to maintain the equipment. Therefore, although the liquid binder printing technique represents an advance in speed and cost over the selective laser sintering process, it suffers from reliability problems that slow down the build rate, increasing labor and equipment maintenance costs. This problem interferes with the potential speed advantage of increased printing capability presented by the plurality of spray nozzles.

In addition to the above-mentioned disadvantages, the powders, especially metallic powders, used in both selective laser sintering and liquid binder techniques present safety issues that render them undesirable for use in an office environment. These safety issues may require special clothing and processing facilities to prevent, for example, skin contact or inhalation of toxic materials. In addition, more expense may be incurred through complying with regulations for the disposal of toxic materials. For these reasons, these techniques do not lend themselves to being used in typical office environments, such as architectural and design firms, or doctors' offices.

U.S. Pat. No. 5,490,962 to Cima discloses solid free-form techniques for making medical devices for controlled release of bioactive agents.

U.S. Pat. No. 5,639,402, to Barlow discloses a method for selectively fusing calcium phosphate particles that are coated, or alternatively mixed with, a polymeric binder material.

SUMMARY

The present invention is directed to a three dimensional printing composition having about 10% to about 50% by weight of an adhesive material, 0% to about 20% by weight of a first fibrous component; and 0% to about 80% by weight of a filler.

Another embodiment of the invention is directed to a three dimensional printing composition comprising a particulate material having a mean particle size of about 10 microns and about 300 microns and a soluble adhesive, wherein the adhesive material is up to about 50 percent by weight of the composition.

In another embodiment, a method of three dimensional printing is provided. The method includes providing a three dimensional printing composition comprising a particulate material having about 10%-about 50% by weight of an adhesive material, 0% to about 20% by weight of a first fibrous component, and 0% to about 80% by weight of a filler, and providing instructions for using the three dimensional printing composition.

Another embodiment of the present invention is directed to a three dimensional printing composition including a particulate material including plaster, a first adhesive, a second adhesive, and an accelerator.

In yet another embodiment of the invention, a kit for three dimensional printing is provided. The kit includes a three dimensional printing composition and an aqueous fluid, wherein the three dimensional printing composition comprises a particulate material including plaster and a first adhesive.

Other advantages, novel features, and objects of the invention will become apparent from the following detailed description of non-limiting embodiments of the invention when considered in conjunction with the accompanying drawings, which are schematic and which are not intended to be drawn to scale. In the figures, each identical or nearly identical component that is illustrated in various figures typically is represented by a single numeral. For purposes of clarity, not every component is labeled in every figure, nor is every component of each embodiment of the invention shown where illustration is not necessary to allow those of ordinary skill in the art to understand the invention. In cases where the present specification and a document incorporated by reference include conflicting disclosure, the present specification shall control.

BRIEF DESCRIPTION OF THE DRAWINGS

Preferred non-limiting embodiments of the present invention will be described by way of example with reference to the accompanying drawings, in which.

DETAILED DESCRIPTION

The present invention relates to a 3DP™ material system comprising a mixture of an aqueous fluid and a particulate material that includes plaster. The aqueous fluid contains water that hydrates the plaster contained in the particulate material, to form an essentially solid article. Various processing aids may be added to either the particulate material, the aqueous fluid, or both, including, but not limited to, accelerators, adhesives, flowrate enhancers, humectants, and visible dyes. The present invention also relates to a method of using such a materials system, and to an article made by the method of the invention. The material system and method of the invention may be used to manufacture both appearance models and small numbers of functional parts in an office environment, including prototype articles, but is not limited to the formation of prototype articles. "Prototype article," as used herein, is meant to define a relatively easily produced model, such as a bone, or a representation of a production part, such as a gear, bearing, shaft, etc., made of material completely different from that which the production part is made, for purposes of simplicity, speed, and economy. Rapid prototyping, generally, is known in the art.

Plaster is frequently called "Plaster of Paris," a name derived from the earths of Paris and its surrounding regions, which contain an abundance of the mineral gypsum, from which Plaster of Paris is manufactured. Plaster is also referred to by many other names, including, but not limited to, sulphate of lime, semihydrate of calcium sulfate, casting plaster, gypsum plaster, hydrated sulphate of lime, hydrated calcium sulphate, and dental plaster, as well as a variety of trade names. The term "plaster," as used herein, is meant to define any variety of material including a substantial amount of $CaSO_4 \cdot \frac{1}{2}H_2O$ that is in powder form prior to the application of an aqueous fluid. The terms "hydrated plaster" and "set plaster" are used interchangeably herein, and are meant to include any variety of plaster that includes a substantial amount of $CaSO_4 \cdot 2H_2O$ after setting, or rehydration. Many varieties of plaster are commercially available, varying, for example, in structural strength, the time required for setting, and in volume changes that occur during the setting. Typically, commercially available plasters include other ingre- dients such as, but not limited to, silica, powder limestone, starch, Terra Alba, and lime. Examples of commercially available plaster materials that may be suitable for the present invention include, but are not limited to, white hydrocal cement, durabond 90, and drystone (each available from U.S. Gypsum, located in Chicago, Ill.), as well as most brands of casting plaster, molding plaster, and spackling compound.

When calcined at about 350° F., gypsum loses a substantial amount of its water of crystallization, and is thereby transformed into plaster. The dehydration, or "calcination" of gypsum, proceeds according to reaction (1) below:

$$2(CaSO_4.2H_2O) + heat \rightarrow (CaSO_4)_2.H_2O + 3H_2O\uparrow \quad (1)$$

Conventional plaster processing generally involves vigorously and thoroughly mixing plaster and water to form a slurry that is saturated with water and poured into a mold to "set up," which typically takes about 30 minutes. After the plaster is mixed with the water, small quantities of the plaster crystallize and interlock together, cementing together the remaining insoluble particles. The interlocking of crystals is responsible for a great deal of the eventual physical strength of the set plaster. Conventionally, during the period in which the plaster sets up, any physical disturbance to the setting plaster should be minimized, or the plaster may not achieve its potential maximum strength, because the minute crystals of gypsum will not completely interlock. When mixed with sufficient water, plaster recovers the 1½ parts of water it possessed prior to calcination of the gypsum, and sets to a solid material of substantially the same composition as gypsum. When properly calcined, plaster is fairly insoluble in cold water and only slightly soluble in warm water. For example, at room temperature, about one part of plaster is soluble in about 400 parts of water. The rehydration, or re-crystallization of plaster, after it has been mixed with water, is referred to as "setting," and proceeds according to the following equation (2):

$$(CaSO_4)_2.H_2O + 3H_2O \rightarrow 2(CaSO_4.2H_2O) + heat \quad (2)$$

Figure 1:
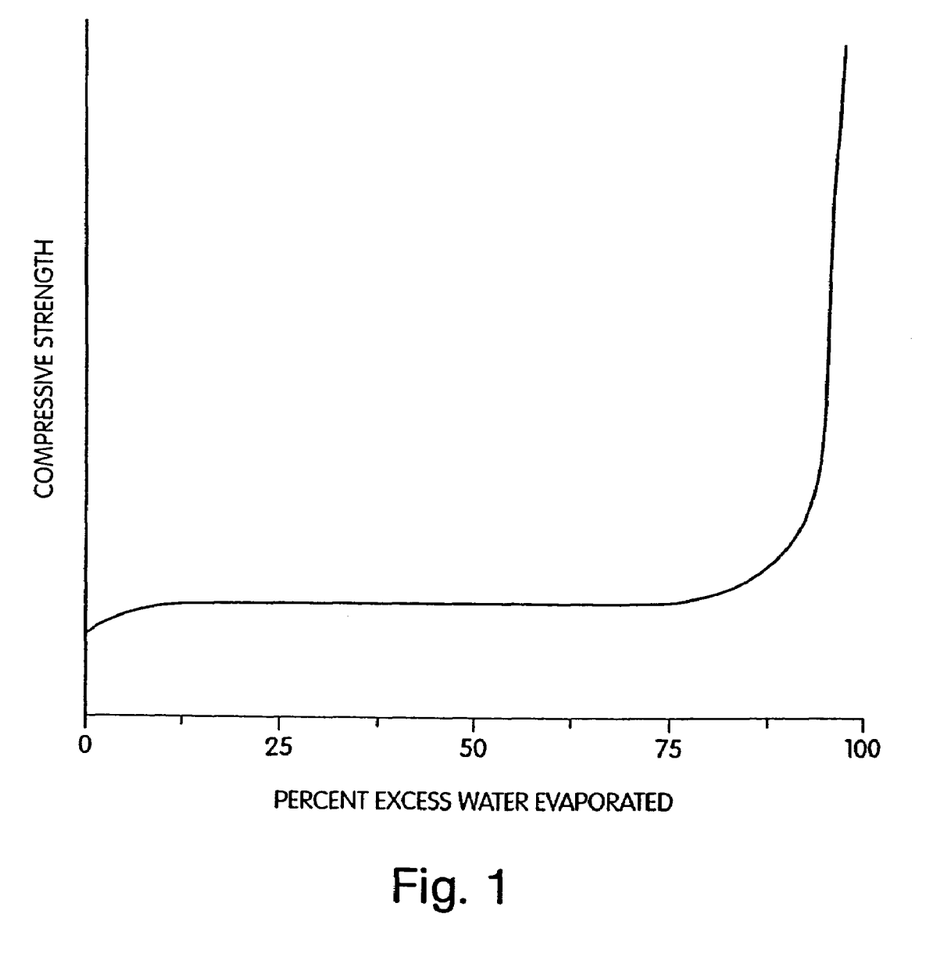
FIG. 1 is a graph of the relationship between plaster strength and water content of a plaster.

As shown in FIG. 1, the strength of a plaster-based article increases substantially after about 93% of the free moisture has been removed. Therefore, subsequent to crystallization, or setting, all of the water in excess of that required for crystallization is removed by accelerated drying or by the natural slow evaporation of the moisture to increase the strength of the final article. The time for removal of the excess water will vary with the type of plaster, the ratio of water to plaster, atmospheric moisture, temperature, and air circulation.

As described above, the material system of the present invention includes a mixture of an aqueous fluid, and a particulate material that includes plaster. For purposes of the present invention, "particulate material" is meant to define any material containing significant amounts of plaster, and which may additionally include other materials, such as, but not limited to, accelerators, adhesives, printing aids, flowrate enhancers, humectants, visible dyes, oils, fiber, and filler.

Examples of fillers include, but are not limited to, glass beads, sand, rayon fiber, cellulose, limestone, zircon, olivine, staurolite, chromite, alumina, mullite, bohemite, kaolin, and bentonite. Examples of oils include, but are not limited to, oleoyl alcohol, dodecyl alcohol as well as other aliphatic alcohols, polypropylene glycol, polyethylene glycol, ethers of polypropylene glycol or polyethylene glycol, mineral oil, fatty esters such as methyl oleate, ethylene glycol octyl/decyl ester, glycerol tributyrate, and Iodyne. Examples of fibers include, but are not limited to polymeric fiber, ceramic fiber, graphite fiber, and fiberglass. Polymeric fibers may be cellulose and its derivatives, and substituted or unsubstituted, straight or branched, alkyl or alkene monomers of up to 8 carbon atoms. Examples of printing aids include, but are not limited to, lecithin, hydrophilic lecithin, polypropylene glycol, citronellol, polyethylene glycol, sorbitan trioleate, sorbitan mono-oleate, ethylene glycol di-octyl-decyl ester, and ethoxylated fatty-acid esters of sorbitan, glycerol, ethylene glycol and propylene glycol. Examples of these and other additives may be found in U.S. Pat. No. 5,902,441, issued May 11, 1999, which is hereby incorporated by reference in its entirety for all purposes.

Generally, the size of the particles in the particulate material is limited by the thickness of the layers to be printed. That is, the particles are preferably approximately smaller than the thickness of the layers to be printed. Using smaller particles may provides advantages such as smaller feature size, the ability to use thinner layers, and the ability to reduce what is known in the art as a "stair stepping" effect. In preferred embodiments, the material system includes particulate material having particles with a mean diameter ranging from about 10 μm to about 300 μm, more preferably ranging from about 10 μm to about 100 μm, and more preferably ranging from about 10 μm to about 50 μm.

One of the most important factors in determining the ultimate hardness and physical strength of the set plaster is generally considered the ratio of plaster to water. A "heavy" mix, consisting of a low proportion of water to plaster, results in a harder and heavier set plaster than that which results from a "normal" mix, in which an excess of water to plaster is used. Generally, about 20 units of water per 100 units of plaster are required for crystallization, but more water is usually added in order to achieve satisfactory pouring of the plaster/water mixture. For example, a typical plaster/water mixture suitable for pouring may include a ratio of about 60 parts of water to 100 parts of plaster, leaving an excess of about 40 parts of "free" water remaining within the plaster article after setting.

For purposes of the present invention, "aqueous fluid," as used herein, is meant to define any fluid containing sufficient water to set up the plaster contained in the particulate material, which is readily determined by those of ordinary skill in the art. In general, increasing the ratio of water to plaster increases strength of the final article. Therefore, maximizing the amount of aqueous fluid printed to the particulate material layer will generally increase the strength of the final article, but sometimes at the expense of increasing the amount and/or severity of distortions in the printed article. "Distortions," as used herein, includes, but is not limited to warping, caking, and bleeding. Consequently, the ratio of water to plaster is practically limited by several factors, including the desired speed of printing, and the acceptable amount of distortion in the final article. In theory, 100% water may be printed as the aqueous fluid—but in practice, the nozzles may clog. Therefore, it may be desirable to include various processing aids in the aqueous fluid, while maintaining a sufficient amount of water to react with the plaster. Preferably, the amount of water contained in the aqueous fluid may range from about 20% to about 100%, but is preferably in the range of about 50% to about 99%, by weight of the fluid. The ratio of aqueous fluid printed to the particulate material preferably ranges from about 5% to about 75%, and more preferably from about 30% to about 70%, by volume of the bulk particulate material, including all pore spaces.

In some instances, it may be desirable to print very small features. The size of features that may be printed is determined, in part, by the size of the droplets dispensed from the nozzle. In general, smaller nozzles produce smaller droplets and smaller printed features. However, smaller nozzles reduce the printing speed, as the volume of water printed on the layer of particulate material decreases, and clogging may occur as well. Occurrences of nozzle clogging may be avoided by using larger nozzles, which dispense larger droplets. Again, the size of the nozzle and droplets may be practically limited by the acceptable amount of distortion in the final article. Preferably, the individual droplets of aqueous fluid have a volume ranging from about 30 pl to about 200 pl. Two commercially available print heads provide droplet sizes ranging from about 70 pl to about 90 pl, and from about 110 pl to about 130 pl. Typically, the material system and method of the present invention are capable of producing features on the order of about 75-125 µm, but smaller or larger features may be achieved by changing the droplet size.

Once the aqueous fluid is printed onto the particulate material layer, a process which is described in more detail below, the water contained in the aqueous fluid immediately begins to evaporate and to diffuse away from the location where it was printed. Maximizing the amount of aqueous fluid printed to the layers ensures that sufficient water for the rehydration of the plaster may be drawn from the fluid before it evaporates or migrates, and also because the fluid acts as a vehicle in which the reaction may take place. The aqueous fluid is capable of bonding together the particulate material in an amount that is several times the mass of a droplet of the fluid. The amount by which the individual droplets expand or migrate into the particulate material depends on many factors, including the rate at which the water and the plaster react, and may also be affected by the addition of additives to either the particulate material and/or the aqueous fluid.

In other embodiments, either the particulate material, the aqueous fluid, or both, may include one or more processing aids. For example, in the present invention, it is desirable for the plaster set as quickly as possible. Therefore, to facilitate quick setting, accelerators are frequently used. "Accelerator," as used herein, is meant to define any material that increases the rate at which plaster sets. Examples of ways to accelerate the rate of plaster include, but are not limited to, increasing the solubility of plaster in water, or by providing additional nucleation sites for crystal formation. Accelerators are generally used sparingly in conventional plaster processing, as they may adversely affect the strength characteristics of the plaster. However, accelerators are preferred in the present invention due to the importance of having the plaster set quickly. Suitable accelerators include, but are not limited to, Terra Alba, potassium sulfate, sodium chloride, under calcined plaster, alum or potassium alum, lime, and calcined lime. Additional examples of suitable accelerators for plaster include, but are not limited to barium sulfate, magnesium sulfate, zinc sulfate, calcium chloride, calcium formate, calcium nitrate, sodium silicate, potassium, sodium and ammonium sulfates and chlorides. Terra Alba, which is raw ground gypsum, is a preferred accelerator, and works by providing additional nucleation sites for gypsum crystal formation. Another preferred accelerator is potassium sulfate, which is thought to work by increasing the solubility of the plaster in the water. Both Terra Alba and potassium sulfate also increase the final strength of the article. In one embodiment, at least one accelerator is preferably added to the particulate material or to the aqueous fluid in order to increase the rate at which the plaster sets. In another embodiment, at least one accelerator is preferably added to both the particulate material and to the aqueous fluid in order to increase the rate at which the plaster sets. In general, the ratio of accelerator to particulate material is dependent on the type of plaster being used. In preferred embodiments, when an accelerator is added to the particulate material, it is preferably an amount of less than about 5%, more preferably less than about 3%, and more preferably less than about 2%, by weight of the particulate material. When an accelerator is added to the aqueous fluid, it is preferably added in an amount of less than about 5%, more preferably less than about 3%, and more preferably less than about 2%, by weight of the aqueous fluid. When an accelerator is added to both the particulate material and the aqueous fluid, it is preferably in the same proportions discussed previously.

Since it is important in the present invention that the plaster set as quickly as possible, the addition of retardants should be avoided. Slowing down the rate at which the plaster sets may allow too much of the aqueous fluid to migrate away, or the water to vaporize, before sufficient plaster and water have reacted. Examples of such retardants include, but are not limited to, borax, marshmallow root, alcohol, sugar, sorghum, potassium acid tartrate, powdered horn, hair, various organic substances, and citric or acetic acid.

In other embodiments, the particulate material, the aqueous fluid, or both, may include an adhesive or a combination of adhesives. The adhesive and plaster synergistically interact to form parts that are stronger than either of the individual materials. One embodiment includes at least one adhesive added to the particulate material or to the aqueous fluid in order to improve the strength and toughness of the final article. In another embodiment, at least one adhesive is added to both the particulate material and to the aqueous fluid. As used herein, "adhesive" is meant to define a material that is at least slightly soluble in, and preferably substantially soluble in, or activated by, any component of the aqueous fluid, or by heat, and that forms secondary bonds between the particles of material that were at least partially separate before dissolution or activation. It should be understood that the primary bonds between the particles of material that were separate before the addition of the aqueous fluid are the interlocking gypsum crystals, which also provide the bulk of the strength to the final article. The choice of the specific type, grade, and particle size of the adhesive is important, as the adhesive contributes to the quality and strength of the final article. Those of ordinary skill in the art may select suitable adhesives through routine experimentation. Particulate adhesives may be screened or comminuted to the desired size, which is typically less than about 170 mesh, and preferably less than about 175 mesh.

Preferably, the adhesive, or combination of adhesives, is at least partially water soluble, and more preferably substantially water soluble. It appears that there is a synergistic relationship in the techniques of the invention between the plaster and a water soluble adhesive, by which the setting plaster draws water from the adhesive solution, causing the adhesive to set more rapidly. As the aqueous fluid dissolves, partially dissolves, activates, or reacts with the adhesive, the viscosity of the aqueous fluid increases dramatically, arresting further migration of the aqueous fluid from the initial point of impact. Within a few minutes, the aqueous fluid with adhesive dissolved therein infiltrates the only slightly soluble plaster particles and/or crystallized gypsum crystals, forming adhesive bonds therebetween.

As stated previously, an adhesive, or adhesives, may be added to the particulate material and/or the aqueous fluid. In the present embodiment, the adhesive is preferably a water soluble resin, such as, but not limited to, polyvinyl alcohol, (PVA), polyvinyl pyrrolidone (PVP), or dextrin. In addition to adding strength to the final article, the addition of a water soluble adhesive resin may also reduce distortion in comparison to parts bound together solely by water, or by a water soluble adhesive. When any of the previously described adhesives are added to the particulate material, the amount of adhesive in the particulate material is dependent on the type of adhesive and plaster used, and may be determined by routine experimentation. In the embodiment where an adhesive or combination of adhesives is added to the particulate material, it is preferably added in an amount of less than about 50%, and more preferably in an amount of about 20% to about 40%, by weight of the particulate material. When an adhesive or combination of adhesives is added to the aqueous fluid, it is preferably added in a ratio of about 10%, by weight of the fluid.

Figure 2:
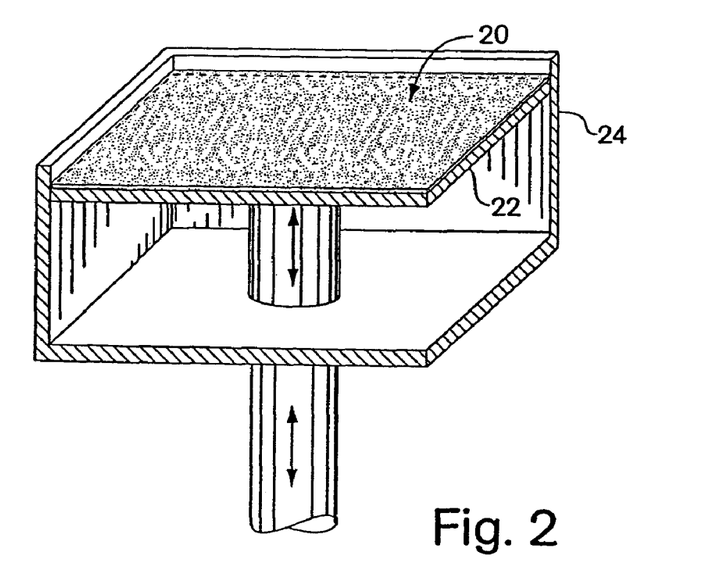
FIG. 2 illustrates schematically a first layer of a mixture of particulate material of the invention deposited onto a downwardly movable surface on which an article is to be built, before any fluid has been delivered.
Figure 3:
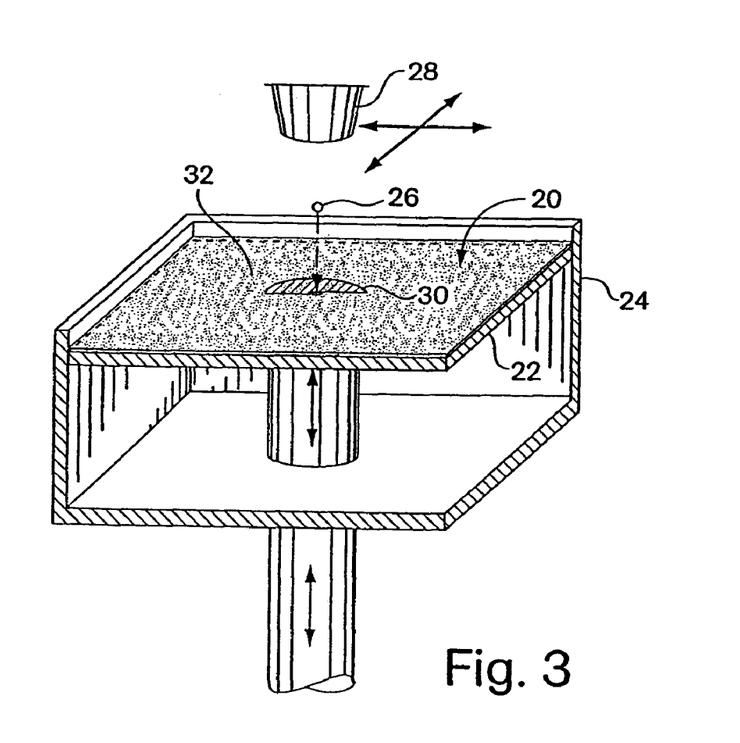
FIG. 3 illustrates schematically an ink-jet nozzle delivering an activating fluid to a portion of the layer of particulate material of FIG. 2 in a predetermined pattern.

Referring now to FIGS. 2 and 3, a schematic representation of a printing method using the materials system of the present invention is presented. According to the method, a layer of particulate material 20 is applied on a downwardly movable surface 22 of a container 24. The layer of particulate material 20 may be formed in any manner, and preferably is applied using a counter-roller, which minimizes disruption of any previously applied layers. The thickness of an individual layer used to build the prototype articles of the present invention preferably range from about 12 μm to about 125 μm, more preferably from about 50 μm to about 125 μm, and more preferably still from about 50 μm to about 75 μm. In theory, there is no limit on the thickness of the layers of particulate material other than the capability of the equipment being used. In practice, the layers of particulate material are typically limited by the amount of aqueous fluid that may be delivered to the layer, as described below.

FIG. 3 is a schematic representation of an ink-jet nozzle 28 delivering a plurality of droplets of an aqueous fluid 26 to a portion 30 of the layer 20 of the particulate material in a two-dimensional pattern. According to the method, the aqueous fluid 26 is delivered, or printed, to the layer of particulate material in any predetermined two-dimensional pattern (circular, in the figures, for purposes of illustration only), using any convenient mechanism, such as a Drop-On-Demand (hereinafter "DOD") printhead driven by customized software which receives data from a computer-assisted-design (hereinafter "CAD") system, a process which is known in the art. In the first portion 30 of the particulate material layer, a reaction is initiated between the plaster contained in the particulate material layer and the water contained in the aqueous fluid, causing the plaster to rehydrate. The reaction product of the aqueous fluid and particulate material forms an essentially solid circular layer that becomes a cross-sectional portion of the final article.

Any undissolved or unreacted particulate material 32 that was not exposed to the aqueous fluid remains loose and free-flowing on the movable surface. Preferably, the undissolved or unreacted particulate material is left in place until formation of the final article is complete. Leaving the loose particulate material in place ensures that the article is supported during processing, allowing features such as overhangs, undercuts, and cavities (not illustrated, but conventional) to be defined without using support structures. After formation of the first cross-sectional portion of the final article, the movable surface is indexed downward.

Using, for example, a counter-rolling mechanism, a second layer of particulate material is then applied over the first, covering both the rigid first cross-sectional portion 30, and any loose particulate material by which it is surrounded. A second application of aqueous fluid follows in the manner described above, which reacts with the plaster in the newly printed layer and with the plaster in a portion of the previous cross-sectional portion, as well as hardening to form a second rigid cross-sectional portion added to the first rigid cross-sectional portion of the final article. The movable surface is again indexed downward.

Figure 4:
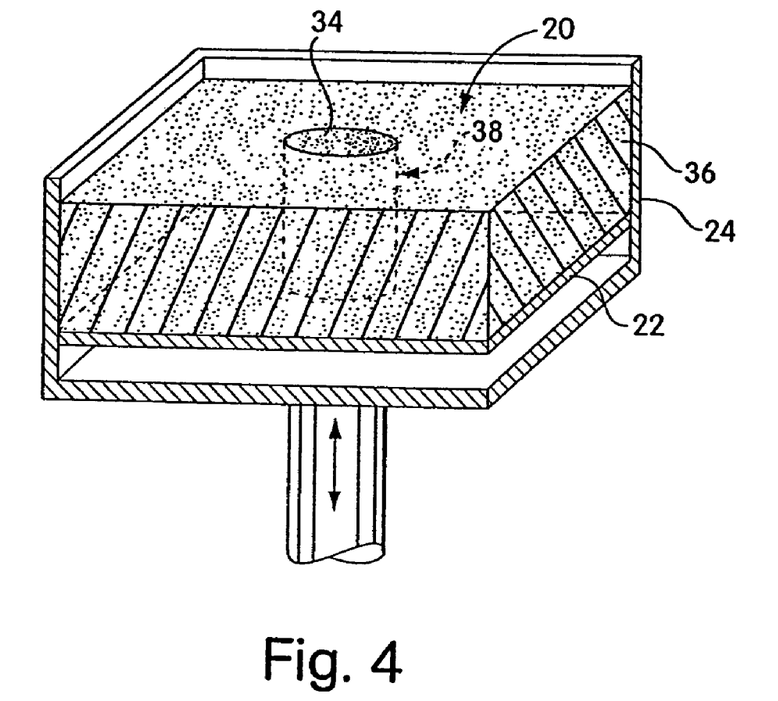
FIG. 4 illustrates schematically a view of a final article made from a series of steps illustrated in FIG. 3 enclosed in the container while it is still immersed in the loose unactivated particles.

The previous steps of applying a layer of particulate material, applying the aqueous fluid, and indexing the movable surface downward are repeated until the final article is completed. Alternatively, those skilled in this art would know how to build an article in layers upward from an immovable platform, by successively depositing, smoothing and printing a series of such layers. FIG. 4 is a schematic representation of a final cylindrical article after it has been completely formed. At the end of the process, only the top surface 34 of a final article 38 is visible in the container. The final article is preferably completely immersed in a bed 36 of undissolved and unreacted particulate material, and is made up of a plurality of essentially evenly distributed layers.

Figure 5:
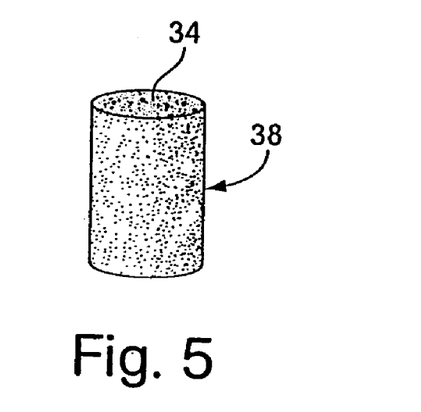
FIG. 5 illustrates schematically a view of the final article from FIG. 4.

FIG. 5 is a schematic representation of the final cylindrical article 38 after removal of undissolved and unreacted particulate material, preferably by blown air or a vacuum. After removal of the undissolved and unreacted particulate material from the final article 38, post-processing treatment may be performed, including cleaning, infiltration with stabilizing materials, painting, etc.

After the final article has been formed, any additional water, or free moisture, must be removed to increase the strength of the printed article. As stated previously, the strength of plaster will increase only slightly until about 93% of the free moisture has been removed, after which the strength increases sharply. Although not required, excess moisture may be removed from the final article by drying at a temperature of at least about 125° F., generally up to a limit of around 350° F. If an adhesive is incorporated into the article, higher drying temperatures may be used, which is dependent on the adhesive used. In general, when an adhesive is used, the flexural strength of the final article increases with the amount of time it is subject to heat.

After the final/article has set, and all loose surrounding powder has been removed, the article may be infiltrated with a variety of materials to improve the hardness, strength, or toughness. These finishes may fill in any pores in the part, improving the surface finish, and making it more impervious to water or solvents. Suitable hardeners include, but are not limited to, molten wax, varnish, lacquer, cyanoacrylate, polyurethane, and epoxy.

A final article formed using the material system and methods of the present invention will include a plurality of evenly distributed layers of the reaction product of the particulate material and the aqueous fluid. The reaction product of the particulate material and the aqueous fluid preferably includes a substantial amount of hydrated plaster, which may vary depending on the particulate material used. In preferred embodiments, the reaction product may include an accelerator, an adhesive, or both. When the reaction product includes an adhesive, the adhesive particles may adhere to at least a portion of the particles contained in the particulate material. As described above with reference to the method of the invention, the reaction product layers preferably each have a thickness in the range of less than about 125 μm, more preferably about 12 μm to about 125 μm, more preferably about 50 μm to about 125 μm, and more preferably still about 50 μm to about 75 μm. For layers having a thickness of less than about 125 μm, the uniformity of the layer typically varies less than about 0.001". The flexural strength of the article of the invention is dependent on, inter alia, the composition of both the particulate material and the aqueous fluid, the ratio of water to plaster, and the amount of additives, if any. In practice, the strength of the articles is limited only by the minimum strength required in order to handle the article without breaking. The preferred flexural strength of the final articles is dependent on the type of article that is formed, but is typically at least about 1 MPa, more preferably at least about 5 MPa, and more preferably at least about 10 MPa. Flexural strength of less than 1 MPa may be sufficient for some applications.

Choosing a plaster suitable for the particulate material of the present invention involves various qualitative evaluations, which may easily be accomplished through routine experimentation by those of ordinary skill in the art. First, a small mound of plaster is formed, a small depression is formed in the mound, and a small amount of water is placed in the depression. Visual observations are made regarding, inter alia, the rate at which the water diffuses into the plaster, the viscosity of the plaster after mixing with water, and whether a membrane is formed around the water. Next, a syringe filled with water is used to strafe the mounds of plaster. After a period of about 24 hours, the mounds of plaster are examined. Those from which all of the water has evaporated are not suitable, as the plaster did not react quickly enough with the water to prevent the water from evaporating or diffusing into the surrounding dry powder. Those in which pebbles of hydrated plaster have formed are more suitable, as it means that the plaster and water react more quickly than the water can evaporate or diffuse into the surrounding dry powder. Those in which both pebbles and rods of hydrated plaster have formed are the most suitable, indicating that the rate at which the water and plaster react is greater than the rate at which water evaporates or diffuses into the surrounding dry powder. In some instances, the rods of hydrated plaster will shrink, indicating that the plaster may give rise to problems with distortions. As described above, various additives may be included in the particulate material and/or aqueous fluid to accelerate the rate at which the plaster sets.

The plaster may also be evaluated to determine the ease of spreading. Simple test parts may also be formed to determine, inter alia, the flexural strength, the distortion, the rate of setting, the optimum layer thickness, and the optimum ratio of water to plaster (or aqueous fluid to particulate material).

Material systems suitable for use in the 3DP™ method include those having reaction products with minimal distortion, in addition to relatively high flexural strength. That is, reaction products with high flexural strength values may not be suitable for use in the 3DP™ method, because distortions may compromise the accuracy of the final printed articles, which is especially applicable where relatively fine features are desired.

EXAMPLES

The function and advantages of these and other embodiments of the present invention will be more fully understood from the following examples. These examples are intended to be illustrative in nature and are not considered to be limiting the scope of the invention. A type of test part that may be formed and used to evaluate the flexural strength of a material system for screening purposes is referred to as a "break bar." Break bars used herein were formed by spreading successive layers of particulate material to which successive applications of an aqueous fluid were made, until the fluid permeated several of the layers. The break bars were then allowed to set. These bars were sawed into 0.2" strips. The flexural strength of the material was determined, in megapascals (MPa), by breaking the bar with a testing device. The qualitative assessment of a material system also involves visually inspecting the parts for distortion.

Examples 1-3

Several materials were screened as described above, and used to form break bars. The results of the break bar tests are shown below in Table 1. Four different types of plaster or particulate material were used. The aqueous fluid used in the first example included about 95% water and about 5% of a humectant, glycerol. An accelerator was added to the aqueous fluid used in the example, which included about 92% water, about 5% glycerol, and about 3% of the accelerator, potassium sulfate. In most instances, the addition of an aqueous fluid improved the flexural strength of the materials, as illustrated by a comparison of the flexural strength measurements from the first and second examples.

TABLE 1

|  | U.S. Gypsum White Hydrocal Cement | U.S. Gypsum Durabond 90 | Kerr Velmix Diestone | U.S. Gypsum Drystone |
| --- | --- | --- | --- | --- |
| Example 1 | 0 | 0.58 | 0.21 | 0.41 |
| Example 2 | 1.14 | 0.96 | 0.63 | 0.35 |
| Example 3 | 2.38 | | | |

The aqueous fluid used in the third example was the same as that used in the second example. An accelerator, Terra Alba, was added to the set plaster having the highest flexural strength from the first and second examples. The addition of an accelerator to the plaster approximately doubled the flexural strength, as shown above in Table 1.

Examples 4-6

The following experiments show the formation of parts by aqueous fluid activation of the particulate material of the present invention, and the results of adding various accelerators and/or adhesives, as well as other processing aids, to either the particulate material or to the aqueous fluid. Example 4 illustrates the effect of adding an accelerator to the material system of the present invention. Examples 5 and 6 illustrate the effect of adding an adhesive to the material system of the present invention.

In Examples 4-6, break bars were formed by spreading successive layers of particulate material, to which successive applications of an aqueous fluid were made, until the thickness of the part reached about 6 mm. The break bar was allowed to set, and the flexural strength of the material was determined, in megapascals (MPa), by breaking the bar with a testing device. The warpage was also determined by measuring the amount of "arching" per two (2) inches of the break bar.

A second test part, used to determine the definition of the particulate material, is referred to as "depowdering" bar, and was printed to a thickness of about 6 mm in the same manner as the break bar. The depowdering bar used in these experiments included 19 holes with varying diameters. When the printing of the depowdering bar part was complete, unbound powder remained in the holes. A jet of compressed air was then used to blow the unbound powder from the holes. The more holes that could be cleared of powder, the more acceptable the definition of the particulate material.

Example 4

One kilogram of particulate material was prepared using the materials and ratios shown below in Table 2. The adhesives were sieved through a 170 mesh screen into a bucket, prior to mixing together by hand with the plaster and accelerator. After hand mixing with the plaster and accelerator, the mixture was placed in a Waring Model 34BL22 Commercial Blender with a two (2) gallon mixing vessel and blended on "high" for about 30 seconds. The resulting blended mixture was then sieved through a 50 mesh screen to remove clumps.

TABLE 2

| Ingredient | Percent | Material/Trade Name | Vendor |
| --- | --- | --- | --- |
| Plaster | 79.2 | White Hydrocal Cement | U.S. Gypsum |
| Accelerator | 20.0 | Dextrin | Staley/Star-dri5 |
| Accelerator | 0.8 | Terra Alba | U.S. Gypsum |

About 2 liters of the aqueous fluid were prepared using the amounts shown in Table 3 below.

TABLE 3

| Ingredient | Percent | Material/Trade Name | Vendor/Grade |
| --- | --- | --- | --- |
| Water | 86.2 | Distilled | Poland Spring |
| Humectant | 6.0 | Glycerol | Aldrich |
| Flow Rate Enhancer | 5.0 | PVP | Aldrich |
| Accelerator | 2.0 | Potassium Sulfate | Aldrich |
| Enhances Solubility of PVP | 0.5 | Isopropyl Alcohol | Osco Drug |
| Flow Rate Enhancer | 0.3 | Ethyl Butyrate | Aldrich |

A break bar and two (2) depowdering bars, were formed from the particulate mixture and an aqueous fluid. The break bar strength was about 18.5 MPa. The break bar had a warping distortion of 0.001", and the edges were curled. The depowdering bars were printed with layers having a thickness of about 3 mil, at a ratio of about 47% aqueous fluid to powder, by volume. Loose powder was removed from 10/19 and 11/19 holes in each of the two depowdering bars.

The results shows the synergistic effect on the break bar strength of the addition of an accelerator and an adhesive to both the particulate material and the aqueous fluid. However, the material system was not optimal due to the distortion after printing.

Example 5

One kilogram of particulate material was prepared using the components and ratios shown in Table 4 below. Adhesives were sieved through a 170 mesh screen into a bucket, prior to mixing together by hand with the plaster and accelerator. After hand mixing with the plaster and accelerator, the mixture was placed in a Waring Model 34BL22 Commercial Blender with a two (2) gallon mix.

TABLE 4

| Ingredient | Percent | Material/Trade Name | Vendor/Grade |
| --- | --- | --- | --- |
| Plaster | 62.4 | White Hydrocal Cement | U.S. Gypsum |
| Adhesive | 30.0 | PVA | Air Products/Airvol 203s |
| Adhesive | 7.0 | Dextrin | Staley/Star-dri5 |
| Accelerator | 0.6 | Terra Alba | U.S. Gypsum |

About 2 liters of the aqueous fluid was prepared using the amounts shown in Table 5 below. The flowrate enhancer and humectant were added to a clean jug, followed by the distilled water, and the jug was capped and shaken until the ingredients were dissolved.

TABLE 5

| Ingredient | Percent | Material/Trade Name | Vendor/Grade |
| --- | --- | --- | --- |
| Water | 86.5 | Distilled | Poland Spring |
| Humectant | 6.0 | Glycerol | Aldrich |
| Flowrate Enhancer | 5.0 | PVP | Aldrich |
| Accelerator | 2.0 | Potassium Sulfate | Aldrich |
| Enhances solubility of PVP | 0.5 | Isopropyl Alcohol | Osco Drug |

A break bar and two (2) depowdering bars were formed from the particulate mixture and the aqueous fluid, as described above. The break bar strength was about 12 MPa, with no measurable distortion. The depowdering bars were printed with layers having a thickness of about 3 mil, and a ratio of about 56% aqueous fluid to particulate material. Loose powder was removed from 11/19 and 13/19 holes in each of the two depowdering bars.

The results of Example 5 again show the synergistic effect on the break bar strength of the addition of an accelerator and an adhesive to both the particulate material and the aqueous fluid. However, the material system was not optimal due to the distortion after printing.

Example 6

One kilogram of particulate material was prepared using the amounts shown in Table 6 below. The adhesives were sieved through a 170 mesh screen into a bucket, prior to mixing together by hand with the plaster and accelerator. After hand mixing with the plaster and accelerator, the mixture was placed in a Waring Model 34BL22 Commercial Blender with a two (2) gallon mixing vessel and blended on "high" for about 30 seconds. The resulting blended mixture was then sieved through a 50 mesh screen to remove clumps, hair, dirt, etc.

TABLE 6

| Ingredient | Percent | Material/Trade Name | Vendor/Grade |
| --- | --- | --- | --- |
| Plaster | 79.2 | White Hydrocal Cement | U.S. Gypsum |
| Adhesive | 17.5 | Dextrin | Staley/Star-dri 5 |
| Adhesive | 2.5 | Cellulose Gel | FMC Avicel RCN-30 |
| Accelerator | 0.8 | Terra Alba | U.S. Gypsum |

About 2 liters of the aqueous fluid was prepared using the amounts shown in Table 7 below. An accelerator, two (2) flowrate enhancers, a humectant, and a substance to increase the solubility of the flow rate enhancers were added to a clean jug, followed by distilled water, and the jug was capped and shaken until the ingredients were dissolved.

TABLE 7

| Ingredient | Percent | Material/Trade Name | Vendor/Grade |
|---|---|---|---|
| Water | 86.2 | Distilled | Poland Spring |
| Humectant | 6.0 | Glycerol | Aldrich |
| Flow Rate Enhancer | 5.0 | PVP | Aldrich |
| Accelerator | 2.0 | Potassium Sulfate | Aldrich |
| Enhances Solubility of PVP | 0.5 | Isopropyl Alcohol | Osco Drug |
| Flow Rate Enhancer | 0.3 | Ethyl Butyrate | Aldrich |

A break bar and two (2) depowdering bars were formed from the particulate mixture and the aqueous fluid, as described above. The break bar strength was about 8.5 MPa, with a distortion of about 2 mils. The depowdering bars were printed with layers having a thickness of about 3 mil, and a ratio of about 49% aqueous fluid to particulate material. Loose powder was removed from 8/19 and 7/19 holes in each of the two depowdering bars.

Examples 7-8

In Examples 7-8, prototype jewelry articles were formed using the same material systems used in Examples 5 and 6. The process for printed the prototype articles is detailed below.

Example 7

Using the same particulate material and aqueous fluid used in Example 5, above, an article was printed using a Z402 3D printer (beta version). An *.stl file containing the "build" information for a prototype piece of jewelry was imported into the software interface of the system. The Z402 3DP printer was filled with the particulate material used in Experiment 4. The "print" button was clicked on the software, and the build process commenced. A single layer of particulate material having a thickness of about 3 mils was applied onto the movable bottom of the build box. The aqueous fluid used in Experiment 4, having droplet sizes ranging from about 70 pl to about 90 pl, was printed onto the layer of particulate material to form the shape of the cross-section of the prototype jewelry article. The bottom of the build box was lowered by one (1) layer thickness and a new layer of powder was spread. The process was repeated for successive cross-sections of the prototype article. Upon completion, the build box was filled with powder, some of which formed the prototype article, and some of which was loose. When the build was finished, the excess powder was vacuumed away and the article was lifted from the bed for viewing.

Example 8

Using the same particulate material and aqueous fluid used in Example 6 above, a jewelry article was printed using a C2000 3DP printer. An *.stl file containing the "build" information for a prototype piece of jewelry was imported into the software interface of the system. The C2000 3DP printer was filled with the particulate material used in Experiment 2. The "print" button was clicked on the software, and the build process commenced. A single layer of particulate material having a thickness of about 3 mils was applied onto the movable bottom of the build box. The aqueous fluid used in Experiment 5, having droplet sizes ranging from about 110 pl to about 130 pl was printed onto the layer of particulate material to form the shape of the cross-section of the prototype jewelry article. The bottom of the build box was lowered by one (1) layer thickness and a new layer of powder was spread. The process was repeated for successive cross-sections of the prototype article. Upon completion, the build box was filled with powder, some of which formed the prototype article, and some of which was loose. When the build was finished, the excess powder was vacuumed away and the prototype article was lifted from the bed for viewing. The article was sanded and infiltrated with ZR10 cyanoacrylate resin and cured for about 30 minutes to produce a harder finish than that of the test parts of Experiment 5.

While several embodiments of the invention have been described and illustrated herein, those of ordinary skill in the art will readily envision a variety of other means and structures for performing the functions and/or obtaining the results or advantages described herein, and each of such variations or modifications is deemed to be within the scope of the present invention. More generally, those skilled in the art would readily appreciate that all parameters, dimensions, materials, and configurations described herein are meant to be exemplary and that actual parameters, dimensions, materials, and configurations will depend upon specific applications for which the teachings of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not mutually inconsistent, is included within the scope of the present invention.

In the claims (as well as in the specification above), all transitional phrases such as "comprising", "including", "carrying", "having", "containing", "involving", and the like are to be understood to be open-ended, i.e. to mean including but not limited to. Only the transitional phrases "consisting of" and "consisting essentially of" shall be closed or semi-closed transitional phrases, respectively, as set forth in the United States Patent Office Manual of Patent Examining Procedures, section 2111.03.

What is claimed is:

1. A three dimensional printing composition, comprising:
   a dry, loose, free-flowing particulate material including:
      about 10% to about 50% by weight of a particulate water-soluble adhesive material;
      0% to about 20% by weight of a first fibrous component;
      semihydrate of calcium sulfate;
      an accelerator; and
      a filler,
   further characterized by absence of a retardant
   wherein the particulate material comprises particles having a mean diameter of about 10 microns to about 100 microns, and is suitable for use in three dimensional printing to form an article comprised of a plurality of layers, the layers including a reaction product of the particulate material and a aqueous fluid that contacts the particulate material during three dimensional printing, the particulate material being capable of supporting the article during three dimensional printing and suitable for being spread in a layer of dry particles having a thickness selected from a range of about 12 to about 125 microns.

2. The three dimensional printing composition of claim 1, further comprising from about 0% to about 30% of a second fibrous component.

3. The three dimensional printing composition of claim 2, wherein the second fibrous component has a length of about 30 microns to about 100 microns.

4. The three dimensional printing composition of claim 2, wherein the second fibrous component has a length less than half the length of the first fibrous component.

5. The three dimensional printing composition of claim 1, further comprising about 0 to about 3 percent, by weight of the total composition, of a printing aid.

6. The three dimensional printing composition of claim 5, wherein the printing aid is selected from the group consisting of lecithin, hydrophilic lecithin, polypropylene glycol, citronellol, and combinations thereof.

7. The three dimensional printing composition of claim 1, wherein the particulate water-soluble adhesive material has an average particle grain size between about 10 and about 20 microns.

8. The three dimensional printing composition of claim 1, wherein the particulate water-soluble adhesive material is a polymer.

9. The three dimensional printing composition of claim 8, wherein the polymer is selected from the group consisting of polyethylene glycol, sodium polyacrylate, polyvinyl alcohol, polyvinyl pyrrolidone, sodium polyacrylate copolymer with maleic acid, polyvinyl pyrrolidone copolymer with vinyl acetate, and combinations thereof.

10. The three dimensional printing composition of claim 1, wherein the particulate water-soluble adhesive material is a carbohydrate.

11. The three dimensional printing composition of claim 1, wherein the filler comprises a carbohydrate.

12. The three dimensional printing composition of claim 10 or 11, wherein the carbohydrate is selected from the group consisting of acacia gum, locust bean gum, sodium carboxy methylcellulose, sodium alginate, hydroxypropyl cellulose, dextrin, maltodextrin, cellulose gel, starch, sugar, and combinations thereof.

13. The three dimensional printing composition of claim 10 or 11, wherein the carbohydrate is a starch selected from the group consisting of: pregelatinized starch, acid-modified starch, and hydrolyzed starch.

14. The three dimensional printing composition of claim 10 or 11, wherein the carbohydrate is a sugar or a sugar alcohol selected from the group consisting of sucrose, dextrose, fructose, lactose, polydextrose, sorbitol, xylitol, and combinations thereof.

15. The three dimensional printing composition of claim 1, wherein the particulate water-soluble adhesive material is an organic acid.

16. The three dimensional printing composition of claim 1, wherein filler comprises an organic acid.

17. The three dimensional printing composition of claim 15 or 16, wherein the organic acid is selected from the group consisting of citric acid, succinic acid, polyacrylic acid, and combinations thereof.

18. The three dimensional printing composition of claim 1, wherein the particulate water-soluble adhesive material is an inorganic compound.

19. The three dimensional printing composition of claim 1, wherein the filler comprises an inorganic compound.

20. The three dimensional printing composition of claim 18 or 19, wherein the inorganic compound is selected from the group consisting of bentonite, sodium silicate, salt, and combinations thereof.

21. The three dimensional printing composition of claim 1, wherein the fibrous component has a length of about 60 microns to about 200 microns.

22. The three dimensional printing composition of claim 21, wherein the fibrous component is a polymeric fiber.

23. The three dimensional printing composition of claim 22, wherein the polymeric fiber is selected from the group consisting of: cellulose fiber, cellulose derivative fiber, ceramic fiber, graphite fiber, and fiberglass.

24. The three dimensional printing composition of claim 21, wherein the fibrous component is selected from the group consisting of: cellulose fiber, silicon carbide fiber, graphite fiber, aluminosilicate fiber, polypropylene fiber and fiberglass.

25. The three dimensional printing composition of claim 1, wherein the adhesive material is about 30 percent, by weight, of the composition.

26. The three dimensional printing composition of claim 1, wherein the filler is about 60 percent, by weight, of the composition.

27. The three dimensional printing composition of claim 1, wherein the first fibrous component is about 10 percent, by weight, of the composition.

28. The three dimensional printing composition of claim 1, wherein the filler comprises up to about 80% by weight of the particulate material.

29. The three dimensional printing composition of claim 1, wherein the filler comprises up to about 30% by weight of the composition.

30. The three dimensional printing composition of claim 1, wherein the filler comprises a material selected from the group consisting of starch, glass beads, and a polymer.

31. A three dimensional printing composition comprising:
   a dry, loose, free-flowing particulate material including:
      about 10% to about 50% by weight of an adhesive material;
      0% to about 20% by weight of a first fibrous component;
      semihydrate of calcium sulfate; and
      0% to about 80% by weight of a filler,
   wherein the adhesive material comprises a polyvinyl pyrrolidone copolymer with vinyl acetate, the adhesive material has an average particle grain size between about 10 and about 20 microns, the filler has a mean particle size between about 20 and about 200 microns, the particulate material comprises particles having a mean diameter of about 10 microns to about 100 microns, and is suitable for use in three dimensional printing to form an article comprised of a plurality of layers, the layers including a reaction product of the particulate material and a aqueous fluid that contacts the particulate material during three dimensional printing, the particulate material being capable of supporting the article during three dimensional printing and suitable for being spread in a layer of dry particles.

32. A method of three dimensional printing, comprising:
   providing a first layer of a three dimensional printing composition including a dry, loose, free-flowing particulate material including about 10% to about 50% by weight of a particulate adhesive material, 0% to about 20% by weight of a first fibrous component, and a filler comprising plaster, the layer comprising dry particles and having a thickness selected from a range of about 12 to about 125 microns;

delivering an aqueous fluid to a portion of the first particulate material layer;

allowing the portion of the first particulate material layer to solidify;

providing a second layer of the three dimensional printing composition including the particulate material;

delivering the fluid to a portion of the second particulate material layer; and allowing the portion of the second particulate material layer to solidify, to form at least a portion of a solid article including a plurality of layers, wherein the particulate material is capable of supporting the article during three dimensional printing.

33. A three dimensional printing composition, comprising:

a dry, loose, free-flowing particulate material having a mean particle size between about 10 microns and about 300 microns, comprising plaster, an at least partially water soluble particulate adhesive material, and a printing aid, wherein the particulate adhesive material is up to about 50 percent, by weight, of the composition, and the particulate material is suitable for use in three dimensional printing to form an article comprised of a plurality of layers, the layers including a reaction product of the particulate material and an aqueous fluid that contacts the particulate material during three dimensional printing, the particulate material being capable of supporting the article during three dimensional printing and suitable for being spread in a layer of dry particles having a thickness selected from a range of about 12 to about 125 microns.

34. The three dimensional printing composition of claim 33, further comprising a filler.

35. The three dimensional printing composition of claim 34, wherein the filler is a carbohydrate.

36. The three dimensional printing composition of claim 34, wherein the filler is a starch.

37. The three dimensional printing composition of claim 33, wherein the printing aid is selected from the group consisting of: polyethylene glycol, sorbitan trioleate, sorbitan monooleate, ethlyene glycol di-octyl-decyl ester, ethoxylated fatty-acid esters of sorbitan, glycerol, ethylene glycol, propylene glycol, polypropylene glycol, citronellol, and combinations thereof.

38. The three dimensional printing composition of claim 33, wherein the at least partially water soluble adhesive is a starch.

39. The three dimensional printing composition of claim 38 or 36, wherein the starch is selected from the group consisting of: pregelatinized starch, acid-modified starch, cationically modified starch, hydrolyzed starch, and combinations thereof.

40. The three dimensional printing composition of claim 38, further comprising a fiber.

41. The three dimensional printing composition of claim 40, wherein the fiber is selected from the group consisting of: polymeric fiber, rayon fiber, ceramic fiber, graphite fiber, fiberglass, and combinations thereof.

42. The three dimensional printing composition of claim 41, wherein the polymeric fiber is a material selected from the group consisting of: cellulose fiber, a polymer derived from an alkyl monomer, a polymer derived from an alkene monomer of up to 8 carbon atoms, and combinations thereof.

43. A three dimensional printing composition, comprising:

a dry, loose, free-flowing particulate material including:
  semihydrate of calcium sulfate;
  a first particulate adhesive that is partially hydrolyzed polyvinyl alcohol;
  a second particulate adhesive; and
  an accelerator, further characterized by absence of a retardant, wherein the particulate material comprises particles having a mean diameter of about 10 microns to about 100 microns, and is suitable for use in three dimensional printing to form an article comprised of a plurality of layers, the layers including a reaction product of the particulate material and an aqueous fluid that contacts the particulate material during three dimensional printing, the particulate material being capable of supporting the article during three dimensional printing and suitable for being spread in a layer having a thickness selected from a range of about 12 to about 125 microns.

44. The three dimensional printing composition of claim 43, further comprising a filler.

45. The three dimensional printing composition of claim 44, wherein the filler is selected from the group consisting of: silica, limestone, starch, and combinations thereof.

46. The three dimensional printing composition of claim 43, wherein the accelerator is selected from the group consisting of: terra alba, potassium sulfate, sodium chloride, undercalcined plaster, alum, potassium alum, lime, calcined lime, and combinations thereof.

47. The three dimensional printing composition of claim 43, wherein the second adhesive is Dextrin.

48. The three dimensional printing composition of claim 43, wherein the second adhesive is Cellulose gel.

49. The three dimensional printing composition of claim 43, wherein the composition includes less than about 20% of the accelerator by weight of the composition.

50. The three dimensional printing composition of claim 49, wherein the composition includes less than about 5% of the accelerator by weight of the composition.

51. The three dimensional printing composition of claim 50, wherein the composition includes less than about 1% of the accelerator by weight of the composition.

52. The three dimensional printing composition of claim 43, wherein the composition includes about 60 to about 80% of semihydrate of calcium sulfate, by weight of the composition.

53. The three dimensional printing composition of claim 52, wherein the composition includes about 15 to about 30% of the first adhesive, by weight of the composition.

54. The three dimensional printing composition of claim 53, wherein the composition includes about 2 to about 10% of the second adhesive, by weight of the composition.

55. A three dimensional printing composition comprising:

a dry, loose, free-flowing particulate material including:
  semihydrate of calcium sulfate;
  a first particulate adhesive;
  a second particulate adhesive; and
  an accelerator, further characterized by absence of a retardant, wherein the first adhesive is Dextrin and the particulate material comprises particles having a mean diameter of about 10 microns to about 100 microns, and is suitable for use in three dimensional printing to form an article comprised of a plurality of layers, the layers including a reaction product of the particulate material and an aqueous fluid that contacts the particulate material during three dimensional printing, the particulate material being capable of supporting the article during three dimensional printing and suitable for being spread in a layer of dry particles having a thickness selected from a range of about 12 microns to about 125 microns.

56. A kit for three dimensional printing, comprising:
a three dimensional printing composition; and
an aqueous fluid comprising an accelerator,
wherein the three dimensional printing composition comprises a dry, loose, free-flowing particulate material including plaster and a first particulate adhesive, the particulate material is suitable for use in three dimensional printing to form an article comprised of a plurality of layers, the layers including a reaction product of the particulate material and the aqueous fluid that contacts the particulate material during three dimensional printing, the particulate material being capable of supporting the article during three dimensional printing and suitable for being spread in a layer of dry particles having a thickness selected from a range of about 12 to about 125 microns.

57. The kit of claim 56, wherein the three dimensional printing composition further includes a second adhesive.

58. The kit of claim 57, wherein the three dimensional printing composition further comprises an accelerator.

59. A kit comprising:
a three dimensional printing composition; and
an aqueous fluid comprising a humectant,
wherein the three dimensional printing composition comprises a dry, loose, free-flowing particulate material including plaster and a first particulate adhesive, the particulate material is suitable for use in three dimensional printing to form an article comprised of a plurality of layers, the layers including a reaction product of the particulate material and the aqueous fluid that contacts the particulate material during three dimensional printing, the particulate material being capable of supporting the article during three dimensional printing and suitable for being spread in a layer of dry particles having a thickness selected from a range of about 12 to about 125 microns.

60. A kit comprising:
a three dimensional printing composition; and
an aqueous fluid comprising a flow rate enhancer,
wherein the three dimensional printing composition comprises a dry, loose, free-flowing particulate material including plaster and a first particulate adhesive, the particulate material is suitable for use in three dimensional printing to form an article comprised of a plurality of layers, the layers including a reaction product of the particulate material and the aqueous fluid that contacts the particulate material during three dimensional printing, the particulate material being capable of supporting the article during three dimensional printing and suitable for being spread in a layer of dry particles having a thickness selected from a range of about 12 to about 125 microns.

61. A three dimensional printing composition, comprising:
a dry, loose, free-flowing particulate material including:
plaster,
a particulate adhesive,
an accelerator,
a filler, and
an oil,
wherein the particulate material is suitable for use in three dimensional printing to form an article comprised of a plurality of layers, the layers including a reaction product of the particulate material and an aqueous fluid that contacts the particulate material during three dimensional printing.

62. The three dimensional printing composition of claim 61, wherein the filler is selected from the group consisting of: silica, limestone, starch, glass beads, sand, rayon fiber, cellulose, limestone, zircon, olivine, staurolite, chromite, alumina, mullite, bohemite, kaolin, bentonite, and combinations thereof.

63. The three dimensional printing composition of claim 61, wherein the accelerator is selected from the group consisting of: terra alba, undercalcined plaster, alum, potassium alum, lime, calcined lime, barium sulfate, magnesium sulfate, zinc sulfate, calcium chloride, potassium sulfate, sodium sulfate, ammonium sulfate, calcium formate, calcium nitrate, sodium silicate, potassium chloride, sodium chloride, animonium chloride, and combinations thereof.

64. The three dimensional printing composition of claim 61, wherein the oil is selected from the group consisting of: oleoyl alcohol, dodecyl alcohol, other aliphatic alcohols, polypropylene glycol, polyethylene glycol, ethers of polyethylene glycol, ethers of polypropylene glycol, mineral oil, fatty esters selected from the group consisting of methyl oleate and ethylene glycol octyl/decyl ester; and glycerol tributyrate.

* * * * *